Nov. 17, 1953 F. H. OWENS 2,659,653

RECORD TAPE MAGAZINE

Original Filed Sept. 15, 1943

INVENTOR.
FREEMAN H. OWENS
BY
Philip S. McLean
ATTORNEY

Patented Nov. 17, 1953 2,659,653

UNITED STATES PATENT OFFICE

2,659,653

RECORD TAPE MAGAZINE

Freeman H. Owens, New York, N. Y.

Original application September 15, 1943, Serial No. 502,717, now Patent No. 2,514,086, dated July 4, 1950. Divided and this application July 1, 1950, Serial No. 171,731

2 Claims. (Cl. 346—136)

Figure 1:
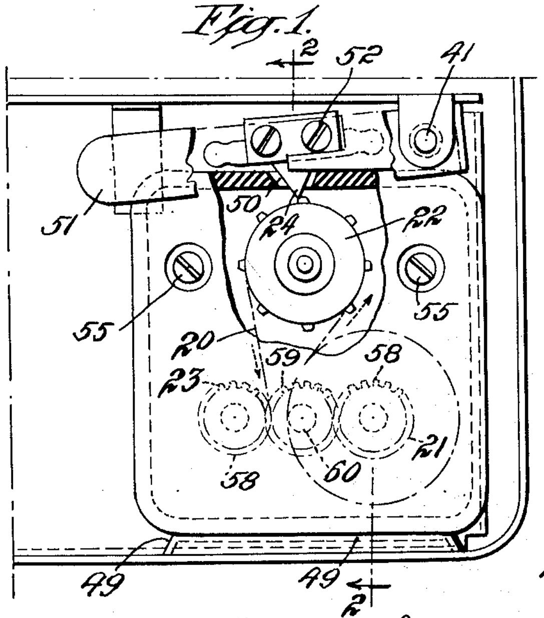

The invention herein disclosed relates to the magazine structure for containing the recording tape employed in radio preference indicating systems, and is a division of patent application Serial No. 502,717, filed September 15, 1943, which issued as Patent 2,514,086 of July 4, 1950.

Special objects of the invention are to provide a form of magazine which can be readily coupled to the recording or marking instrumentalities of the radio receiver and be used for shipping the record medium from the point of recording to the collating and analyzing center.

Further important objects of the invention are to provide this magazine structure in a simple, compact, inexpensive, small size form which will properly protect the record strip and which can be quickly and easily opened and closed for taking out the recorded tape or for inserting fresh recording material.

Other desirable objects attained by the invention and the novel features of construction, combination and relation of parts are set forth or will appear in the course of the following specification.

The drawing accompanying and forming part of the specification illustrates different practical embodiments of the invention. Structure, however, may be modified and changed, all within the true intent and broad scope of the invention as hereinafter defined and claimed. The illustration, therefore, is to be considered primarily by way of disclosure rather than by way of limitation, the true scope of the invention being as defined in the following specification and claims.

Figure 2:
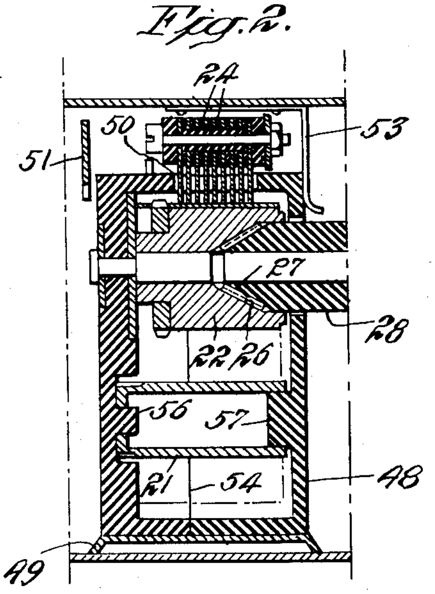
Figures 3, 4:
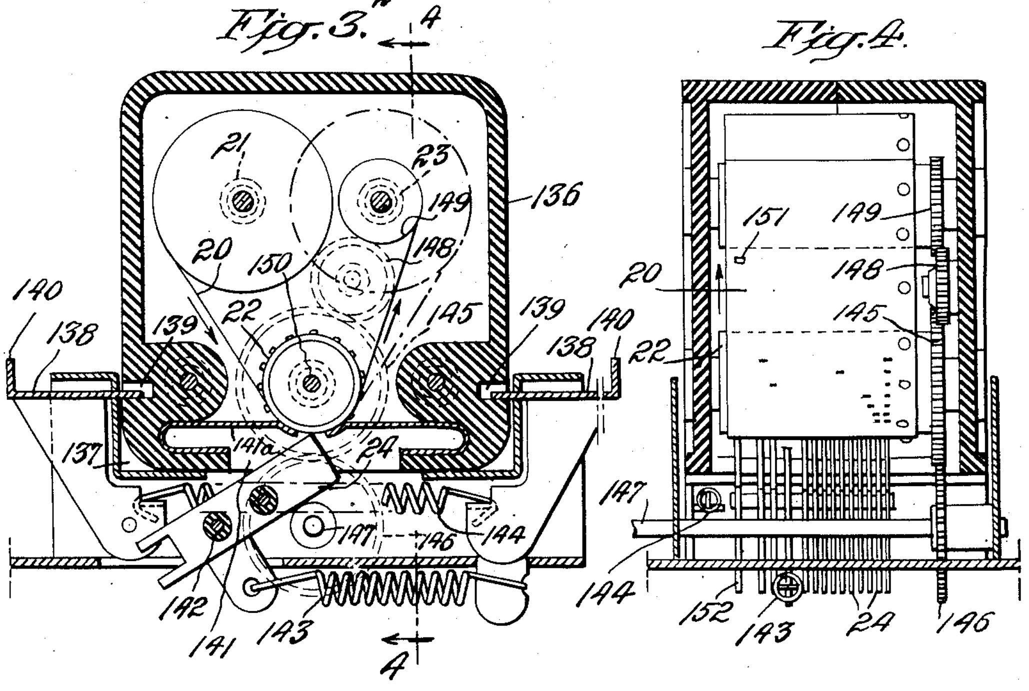

Fig. 1 in the drawing is a broken part sectional view of a form of the record magazine as mounted in a program preselecting receiver of the type disclosed in Freeman H. Owens Patent No. 2,337,568 of December 28, 1943, of which the present parent patent application is a division;

Fig. 2 is a broken cross sectional view of the same on substantially the plane of line 2—2 of Fig. 1;

Figs. 3 and 4 are sectional views of a modified form of recorder, Fig. 3 being taken on substantially the plane of line 3—3 of Fig. 4, and Fig. 4 on substantially the plane of line 4—4 of Fig. 3.

In the first form of the invention disclosed, the record strip or tape 20 is shown extending from a roll on the supply spool or reel 21, over a drive sprocket 22 to a take-up spool 23, in position for electrodes 24 to impose distinguishing marks on the tape.

This tape may be perforated along one edge to be engaged by the teeth of the drive sprocket 22, and the latter is shown as having a conical toothed clutch seat 26 at the back to receive a correspondingly shaped drive cone 27 on the forward end of a drive bushing 28.

The latter is suitably driven, as disclosed in Patents 2,337,568 of December 28, 1943, and 2,514,086 of July 4, 1950.

This drive may be intermittent, for instance on one minute intervals.

The electrodes 24 may be connected for designating different radio stations, phonograph or other uses, so that with each station selecting impulse there will be a discharge from an electrode 24 representing the selected circuit down through the tape to the tape carrying sprocket 22, of conducting material, and by way of the latter, back through the tape to a common return, producing a second indicating mark or perforation in the tape.

Other electrodes associated with the group 24 may be connected for recording "on" and "off" conditions of the machine with which the magazine is associated.

The entire gang of electrodes may be automatically lifted off the record strip for each movement of the latter, by the mechanism disclosed in the patents mentioned.

The entire record tape mechanism is shown carried by and enclosed within an insulating case 48 which can be slipped horizontally into position on a support 49 at the back of the casing to couple the sprocket 22 up with the intermittent drive mechanism therefor.

A slot 50 is shown in the top of the record box for entry of the marking electrodes, and when this box is to be placed in or be removed from the machine, the electrodes may be lifted clear of this opening by a yoke lever 51 shown pivoted on the shaft 41 on which the gang of electrodes is pivoted, with the outer arm of this yoke serving as a handle and the inner arm extending in under the screw projection 52 of the pivoted electrode carrier.

The lever 51, in addition to serving as a means for lifting the electrodes, is shown as dropping down over the front of the record case, Figs. 1 and 2, to hold it back against the yielding stop 53, where the clutch for driving the sprocket 22 will be properly engaged and the electrodes will be properly lined up in the opening 50 over the record strip on the sprocket or platen roller 22.

As the record tape need be moved only a slight distance for each broadcast or other selected period, a short length of tape will carry a long-time record, and this in turn means that the magazine structure may be only a small unit with simple mechanism for spooling the tape, such as indicated.

In the illustration the casing is shown as of split construction at 54, with the two parts held together by through screws 55, and the spools or reels 21, 23, are shown as removably engaged over journal projections 56, 57, on the opposite walls of the casing.

These hollow spools are further shown as having gear toothed ends 58 meshing with an intermediate motion reversing pinion 59 journaled on a wall projection 60 between the spools. Thus, with this construction, the unwinding spool 21 through the intermediate pinion, drives the other, 23, as a take-up spool.

The service recorder described may be located in place so that it cannot be tampered with, thus to assure an accurate record of the use of the machine.

The form of the record, while it may vary, may be substantially like that illustrated in copending Patent No. 2,514,086.

In the form of the invention shown in Figs. 3 and 4, the recorder casing 136 is removably seated in a pocket 137, where it is releasably held by pivoted latches 138 connected by spring 144, entering notches 139 in opposite sides of the record case. Exposed finger holds 140 enable these spring latches to be readily withdrawn to release the record case.

In this particular form of the invention the record tape passing over the sprocket or platen roll 22, is supported and positioned back of an opening 141 in the bottom of the magazine, held so by a spring retainer plate 141*a*.

The electrodes 24 project up through the opening in the bottom of the case and the opening in the spring retainer plate into cooperative relation with the tape supported on the platen roll.

All of these electrodes are shown pivotally supported at 142 and as rocked upwardly into position for cooperation with the tape, by spring 143.

The retainer plate 141*a* yieldingly holds the record strip in position at the recording opening 141, both when the magazine is in position on the receiver and when it is removed from the receiver.

If desired, the latches 138 may have a suitable lock or locks so that only an authorized person with a key for the purpose may release the magazine from the recording machine.

In this particular embodiment of the invention the sprocket wheel 22 is advanced through a gear 145 connected with the platen or sprocket wheel 22 and meshing through the opening in the bottom of the case with a drive gear 146 carried by shaft 147 of the recording mechanism.

The take-up spool 23 is turned by gearing 148, 149, from the gear 145 on the sprocket shaft 150.

In this form of the invention the opening in the bottom of the magazine casing provides access for both the drive gearing which operates the spooling mechanism and the electrodes which impose the markings on the record tape, whereas in the first form of the invention illustrated the opening provided in the top of the magazine casing affords access for the marking instrumentalities and the opening in the back of the case provides access for the means which drives the spooling mechanism.

In all forms of the invention the magazine is of small size, with the case made up of the two front and back parts removably secured together and containing the tape spooling reels connected to be driven and including the platen roll for cooperation with the recording electrodes and arranged to be coupled in driven engagement with the timing train of the program selecting recording mechanism.

In the first form the parts are coupled up by merely lifting the lever 51 and pushing the magazine horizontally back into supported position, with the sprocket coupled over the end of the drive shaft. In the second form the magazine is coupled up for operation by simply dropping it downward into the socket provided for the same.

In both instances the openings in the case admit the recording electrodes into cooperative relation with the record tape of paper or other material extending about the platen roll. The spooling mechanism holds the tape in place when the magazine is removed from the recording machine, and this is particularly true of the second form where the spring retainer holds the tape gripped over the face of the platen roll.

What is claimed is:

1. A magazine for record tape, comprising a casing having an opening in the bottom of the same, record tape spooling mechanism in said casing, including a platen roll in line with said opening and a spring tensioned retainer plate yieldingly engaged over said platen roll for pressing record tape over said platen roll and said retainer plate having an opening therein for admitting means for marking a record on tape passing about said roll beneath said retainer plate.

2. A magazine for record tape, comprising a casing having an opening in the bottom of the same, record tape spooling mechanism in said casing, including a platen in line with said opening for positioning a record tape supported by the spooling mechanism, a support having a pocket in which the bottom portion of the casing is removably received, said casing having notches in opposite sides of the lower portion of the same and disposed within said pocket when the casing is seated therein and spring latches entering opposite sides of said pocket in position to enter said notches in the casing for removably securing the casing in seated position within said pocket.

FREEMAN H. OWENS.

References Cited in the file of this patent

UNITED STATES PATENTS

| Number | Name | Date |
|---|---|---|
| 2,059,879 | La Pierre | Nov. 3, 1936 |
| 2,099,646 | Busch | Nov. 16, 1937 |
| 2,126,299 | Wittel et al. | Aug. 9, 1938 |
| 2,282,074 | Merriman | May 5, 1942 |
| 2,321,273 | Belcher | June 8, 1943 |
| 2,326,654 | Jagust | Aug. 10, 1943 |
| 2,499,895 | Walker | Mar. 7, 1950 |